United States Patent
Liang

(10) Patent No.: US 7,777,970 B2
(45) Date of Patent: Aug. 17, 2010

(54) SUPER-WIDE-ANGLE LENS AND IMAGING SYSTEM HAVING SAME

(75) Inventor: Kuo-Yen Liang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 210 days.

(21) Appl. No.: 11/959,241

(22) Filed: Dec. 18, 2007

(65) Prior Publication Data
US 2009/0116127 A1 May 7, 2009

(30) Foreign Application Priority Data
Nov. 5, 2007 (CN) .......................... 2007 1 0202390

(51) Int. Cl.
*G02B 17/00* (2006.01)
(52) U.S. Cl. .......................... 359/737; 359/738; 348/44
(58) Field of Classification Search ................. 359/737, 359/738, 742, 725, 726; 348/44, 36, 218.1, 348/337, 340
See application file for complete search history.

(56) References Cited
U.S. PATENT DOCUMENTS 5,071,235 A * 12/1991 Mori et al. ................. 359/692
5,281,802 A * 1/1994 Kitabayashi ............. 250/201.5
6,259,508 B1 * 7/2001 Shigematsu ................. 355/53
7,609,289 B2 * 10/2009 Rastegar et al. ............... 348/36
7,671,919 B2 * 3/2010 Iwasaki et al. .............. 348/373
2006/0187557 A1   8/2006 Yamakawa
2006/0215054 A1 * 9/2006 Liang et al. ................. 348/337
2008/0174670 A1 * 7/2008 Olsen et al. .............. 348/222.1

* cited by examiner

*Primary Examiner*—Timothy J Thompson
(74) *Attorney, Agent, or Firm*—Jeffrey T. Knapp

(57) ABSTRACT

An exemplary super-wide-angle lens includes a lens barrel, a set of imaging lenses, and a prism. The set of imaging lenses is received in the lens barrel. The prism has three light incident surfaces, each of which is coated with a unique color filter for exclusively transmitting a predetermined color light, and a light emissive surface. The prism is positioned such that each of the light incident surfaces is configured for receiving light from a unique field of view of the super-wide-angle lens and the light emissive surface faces the set of imaging lenses, and is structured so that light transmitting in the prism is directed from the light incident surfaces to the light emissive surface.

15 Claims, 4 Drawing Sheets

SUPER-WIDE-ANGLE LENS AND IMAGING SYSTEM HAVING SAME

BACKGROUND

1. Technical Field

The invention relates to wide-angle lenses and, particularly, relates to a super-wide-angle lens and an imaging system having the same.

2. Description of Related Art

In order to obtain a wide-angle lens, conventional techniques focus on appropriately establishing the configuration of the wide-angle lens such as the number, the position distribution, and the power distribution of the lenses employed in the wide-angle lens. However, the wide-angle lens thus configured commonly has a limited field angle. Accordingly, an imaging system employing the wide-angle lens also has a limited field angle.

Therefore, it is desirable to provide a super-wide-angle lens and an imaging system with the same, which can overcome the abovementioned problems.

SUMMARY

In a present embodiment, a super-wide-angle lens includes a lens barrel, a set of imaging lenses, and a prism. The set of imaging lenses is received in the lens barrel. The prism has three light incident surfaces, each of which is coated with a unique color filter for exclusively transmitting a predetermined color light, and a light emissive surface. The prism is positioned such that each of the light incident surfaces is configured for receiving light from a unique field of view of the super-wide-angle lens and the light emissive surface faces the set of imaging lenses, and is structured so that light transmitting in the prism is directed from the light incident surfaces to the light emissive surface, and then transmitted to a desired receiving surface such as an image sensor.

BRIEF DESCRIPTION OF THE DRAWINGS

Many aspects of the present super-wide-angle lens and imaging system should be better understood with reference to the following drawings. The components in the drawings are not necessarily drawn to scale, the emphasis instead being placed upon clearly illustrating the principles of the present super-wide-angle lens and imaging system. Moreover, in the drawings, like reference numerals designate corresponding parts throughout the several views.

DETAILED DESCRIPTION OF THE EMBODIMENTS

Figure 1:
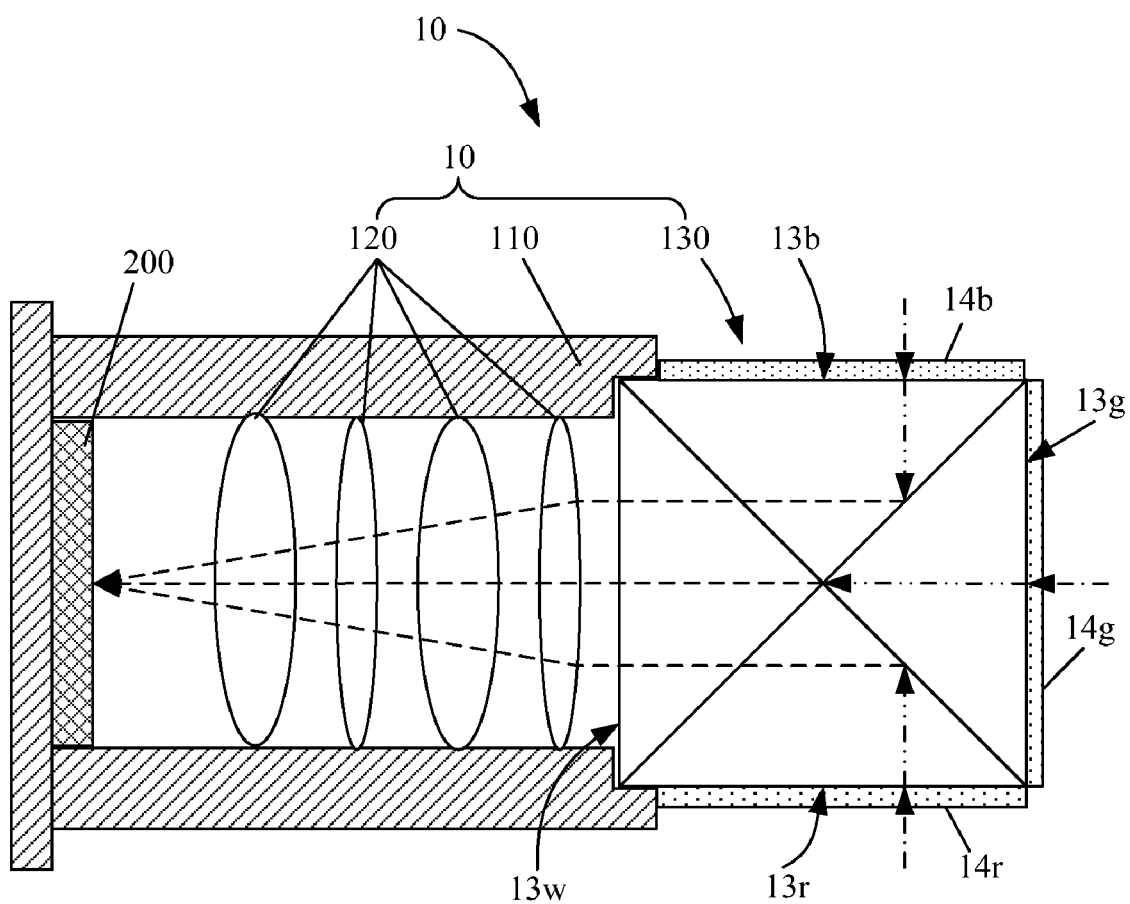
FIG. 1 is a schematic view of an imaging system including a light-sensitive member, according to a first embodiment.

Referring to FIG. 1, an imaging system 10, according to a first embodiment, includes a super-wide-angle lens 100, and a light-sensitive member 200. The light-sensitive member 200 is placed on the image plane of the super-wide-angle lens 100. The super-wide-angle lens 100 includes a lens barrel 110, a set of imaging lenses 120, and a prism 130. The set of imaging lenses 120 is received in the lens barrel 110. The prism 130 has three light incident surfaces 13r, 13g, 13b, each of which is formed (e.g., coated) with a unique color filter 14r, 14g, 14b for exclusively transmitting a predetermined color light, such as, red (R), green (G), and blue (B) light, and a light emissive surface 13w. The prism 130 is positioned such that each of the light incident surfaces 13r, 13g, 13b, is configured for receiving light from a unique field of view of the super-wide-angle lens 100, and the light emissive surface 13w faces the set of imaging lenses 120, and is structured so that light transmitting in the prism 130 is directed from the light incident surfaces 13r, 13g, 13b to the light emissive surface 13w, and then transmitted to the light-sensitive member 200. Thereby, the super-wide-angle lens 100 is capable of receiving light from the three fields of view respectively associated with the three light incident surfaces, and the field angle thereof can approach 270°.

The lens barrel 110 is tubular in shape to fittingly hold the set of imaging lenses 120, and has its object-side end hermetically sealed to the prism 130 and its image-side end hermetically sealed to the light-sensitive member 200 to protect the imaging light channels between the light incident surfaces 13r, 13g, 13b and the light-sensitive member 200 from being disturbed by undesirable leakage light.

The set of imaging lenses 120 includes one or more imaging lenses that can be spherical or aspherical lenses, and can be made of plastic or glass, depending on the quality and cost requirements of the imaging system 10.

The prism 130 can be a cube, known as an X-cube that is formed by four polarization beam splitter (PBS) prisms and is conventionally employed in projection technology for light synthesizing, coated with the three different color filters 14r, 14g, 14b.

Figure 2:
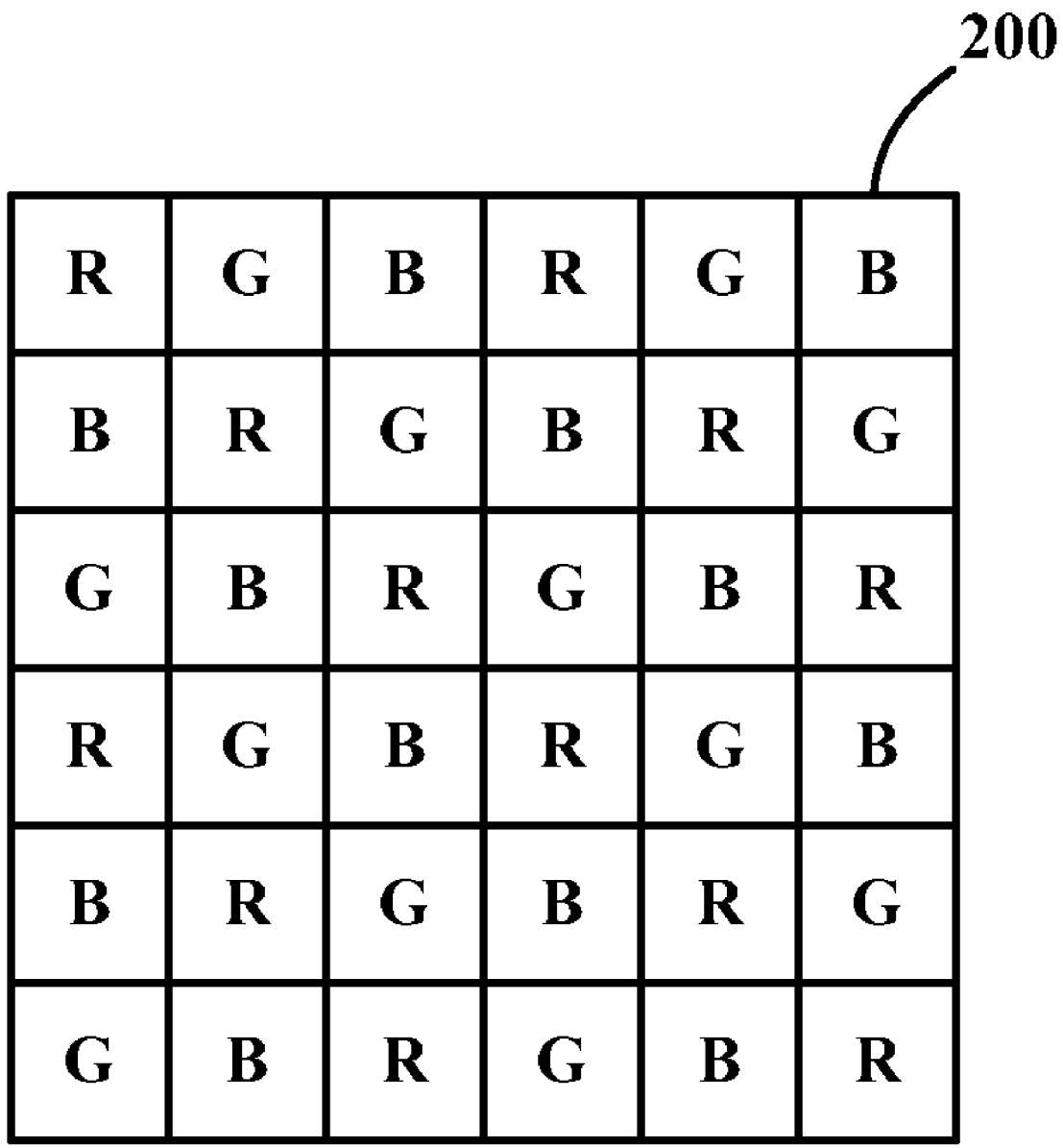
FIG. 2 is a front, detailed view of the light-sensitive member of FIG. 1.

The light-sensitive member 200 can be a coupled charge device (CCD) image sensor, or a complementary metal oxide semiconductor (CMOS) image sensor, and is, as well known, composed of three pixel arrays such as R, G, B arrays (see FIG. 2), each of which is dedicated to exclusively sensing the respective color component of incident light.

Understandably, the imaging system 10 thus configured forms three individual sub-systems, that is, an R sub-system formed between the light incident surface 13r and the R array of the light-sensitive member 200, a G sub-system formed between the light incident surface 13g and the G array of the light-sensitive member 200, and a B sub-system formed between the light incident surface 13b and the B array of the light-sensitive member 200. In other words, the imaging system 10 can capture a compound image, which can be separated into three images by, e.g., an image signal processor (ISP), from three unique fields of view of the imaging system 10.

Figure 3:
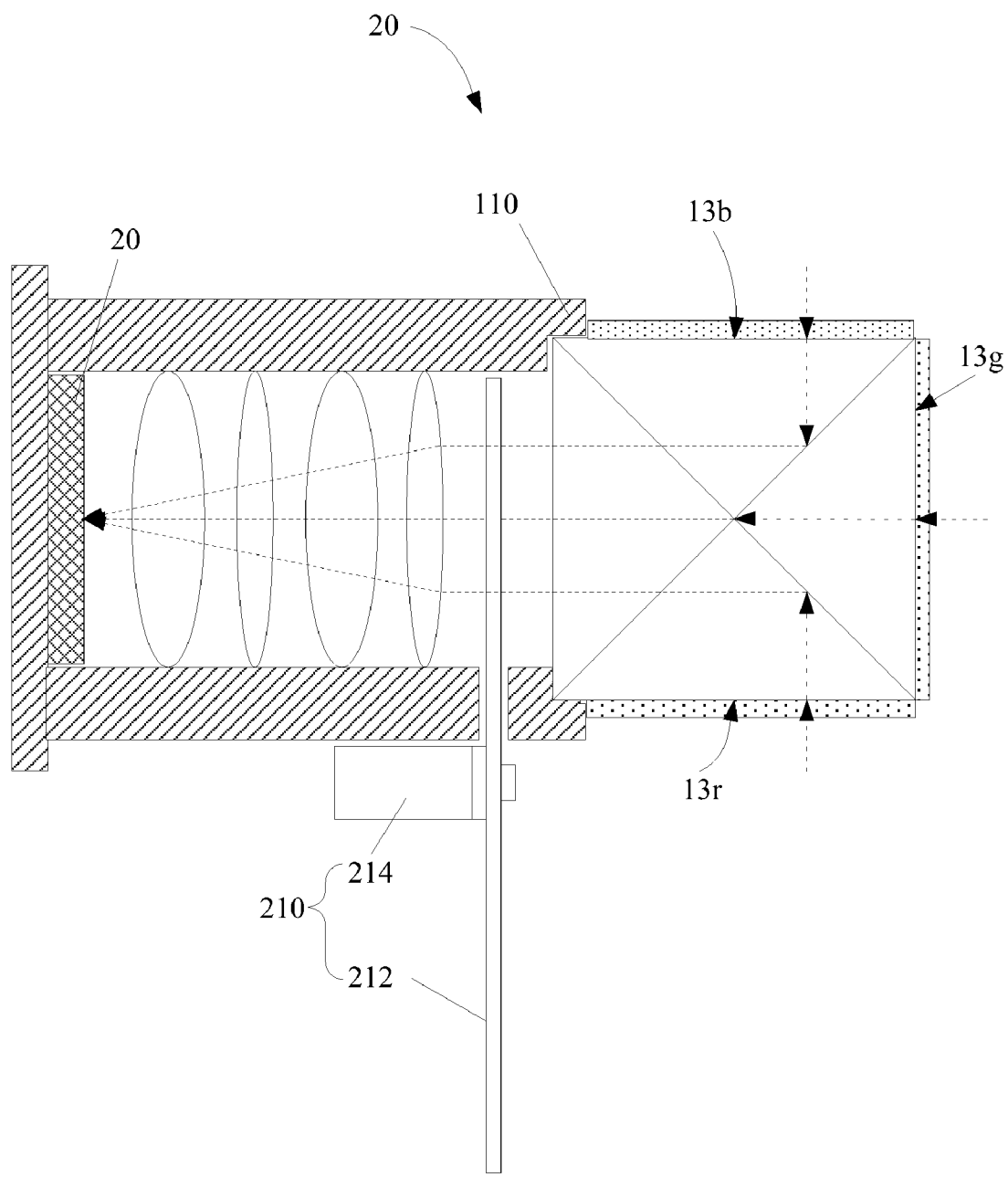
FIG. 3 is a schematic view of an imaging system including a color wheel, according to a second embodiment.

Referring to FIG. 3, another imaging system 20, according to a second embodiment, is essentially similar to the imaging system 10, as shown in FIG. 1, but further including a color wheel 210 interposed between the set of imaging lenses 120 and the prism 130.

Figure 4:
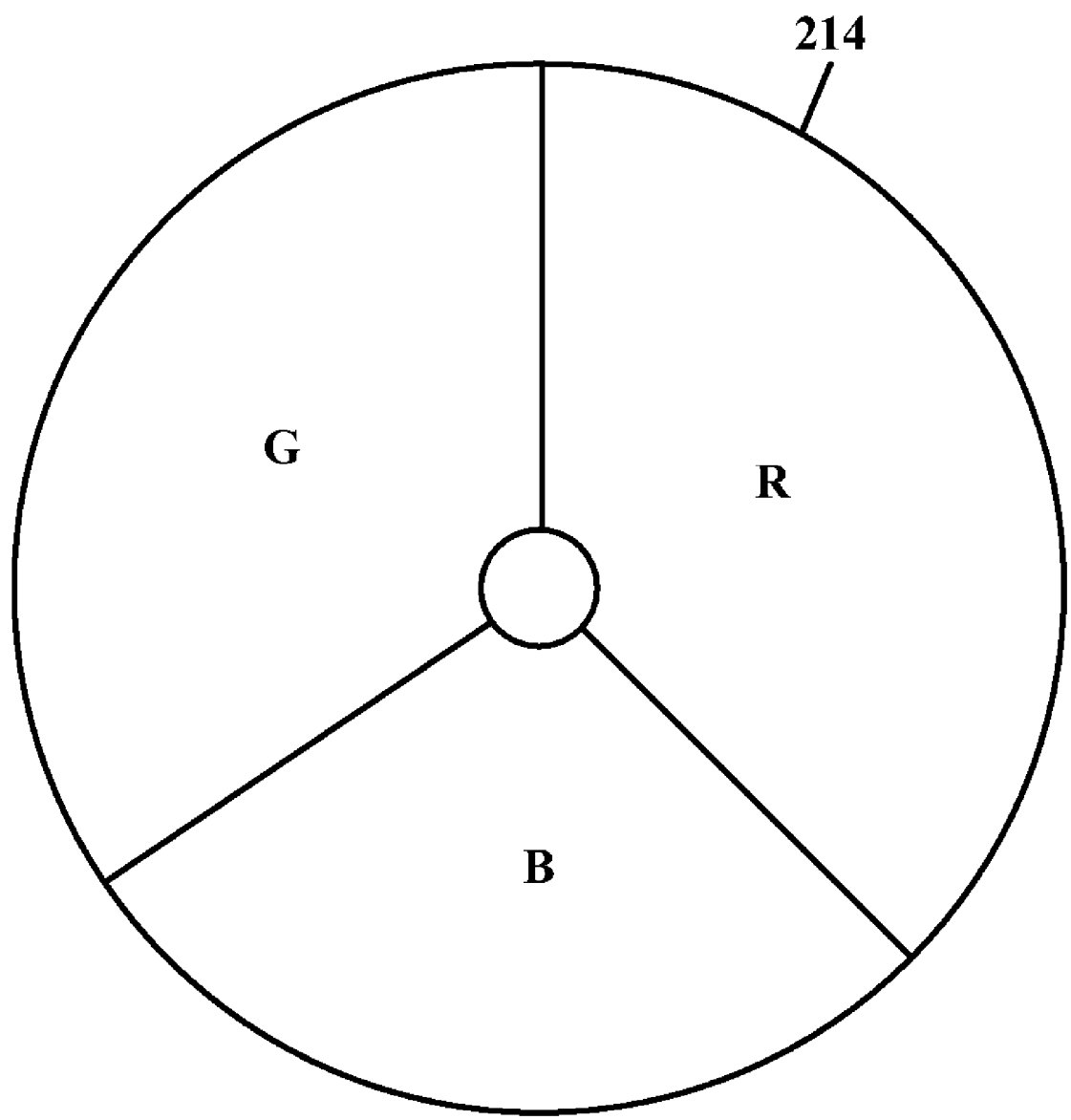
FIG. 4 is a front, detailed view of the color wheel of FIG. 3.

The color wheel 210 includes a color filter unit 212 and motor 214 for driving the color filter unit 212 to rotate. The color filter unit 212 includes a number of sector-shaped color filters, e.g., R, G, and B color filter, which are radially arranged (see FIG. 4). The color filter unit 212 is received in the lens barrel 110 such that the color wheel 210 is capable of dispersing light transmitting through the lens barrel 110, in sequence. Thereby, the imaging system 20 is capable of receiving light from three fields of view associated with the three light incident surfaces 13r, 13g, 13b, and forming consecutive images corresponding to light from the three fields of view, in sequence.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A super-wide-angle lens comprising:
   a lens barrel;
   a set of imaging lenses received in the lens barrel; and
   a prism sealing the object-side end of the lens barrel and comprising three light incident surfaces, each of which is formed with a unique color filter for exclusively transmitting a predetermined color light, and a light emissive surface, the prism being positioned such that each of the light incident surfaces is configured for receiving light from a field of view of the super-wide-angle lens, and the light emissive surface faces the set of imaging lenses, the prism being structured so that light transmitting in the prism is directed from the three light incident surfaces to the light emissive surface.

2. The super-wide-angle lens as claimed in claim 1, wherein the set of imaging lenses comprises a lens selected from the group consisting of spherical glass lens, spherical plastic lens, aspherical glass lens, and aspherical plastic lens.

3. The super-wide-angle lens as claimed in claim 1, wherein the prism is an X-cube.

4. The super-wide-angle lens as claimed in claim 1, further comprising a color wheel interposed between the set of imaging lenses and the prism and received so as to sequentially disperse light transmitting through the lens barrel into a plurality of color lights.

5. An imaging system comprising:
   a super-wide-angle lens comprising:
     a lens barrel;
     a set of imaging lenses received in the lens barrel; and
     a prism sealing the object-side end of the lens barrel and comprising three light incident surfaces, each of which is formed with a unique color filter for exclusively transmitting a respective color light, and a light emissive surface, the prism being positioned such that each of the light incident surfaces is configured for receiving light from a field of view of the super-wide-angle lens, and the light emissive surface faces the set of imaging lenses, the prism being structured so that light transmitting in the prism is directed from the three light incident surfaces to the light emissive surface; and
   a light-sensitive member placed on the image plane of the super-wide-angle lens.

6. The imaging system as claimed in claim 5, wherein the set of imaging lenses comprises a lens selected from the group consisting of spherical glass lens, spherical plastic lens, aspherical glass lens, and aspherical plastic lens.

7. The imaging system as claimed in claim 5, wherein the prism is an X-cube.

8. The imaging system as claimed in claim 5, further comprising a color wheel interposed between the set of imaging lenses and the prism and received so as to sequentially disperse light transmitting through the lens barrel into a plurality of color lights.

9. The imaging system as claimed in claim 5, wherein the light-sensitive member is selected from a group of coupled charge device image sensor and complementary metal oxide semiconductor image sensor.

10. The imaging system as claimed in claim 5, wherein the image-side end of the lens barrel is sealed.

11. A lens comprising:
    a lens barrel;
    a set of lenses received within the barrel; and
    a cubic prism comprising a three light incident outer surface and a light emissive outer surface; each of the light incident outer surfaces being formed with a unique color filter for exclusively receiving a unique corresponding color light from a portion of a total field of view of the lens; the light emissive outer surface configured for facing the set of lenses, the prism being structured for directed light from the light incident outer surface to the light emissive outer surface.

12. The lens as claimed in claim 11, wherein the object-side end of the lens barrel is sealed using the prism.

13. The lens as claimed in claim 11, wherein the set of imaging lenses comprises a lens selected from the group consisting of spherical glass lens, spherical plastic lens, aspherical glass lens, and aspherical plastic lens.

14. The lens as claimed in claim 11, wherein the prism is an X-cube.

15. The lens as claimed in claim 11, further comprising a color wheel interposed between the set of imaging lenses and the prism and received so as to sequentially disperse light transmitting through the lens barrel into a plurality of color lights.

* * * * *